United States Patent
Gingerich et al.

(10) Patent No.: US 6,623,807 B2
(45) Date of Patent: Sep. 23, 2003

(54) STABILIZATION OF COLOR IN HEATED ELECTROLUMINESCENT PHOSPHOR

(75) Inventors: Richard G. W. Gingerich, Towanda, PA (US); Clarence D. Vanderpool, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 276 days.

(21) Appl. No.: 09/910,156

(22) Filed: Jul. 20, 2001

(65) Prior Publication Data

US 2002/0114881 A1 Aug. 22, 2002

Related U.S. Application Data

(60) Provisional application No. 60/256,283, filed on Dec. 18, 2000.

(51) Int. Cl.$^7$ .............................. B05D 3/02; B05D 5/06; C09K 11/56; C09K 11/84
(52) U.S. Cl. ........................ 427/444; 427/64; 427/212; 427/215
(58) Field of Search .................... 427/444, 64, 212, 427/215; 252/301.65

(56) References Cited

U.S. PATENT DOCUMENTS

| | | | | | |
|---|---|---|---|---|---|
| 3,939,377 A | * | 2/1976 | Ignasiak | ...................... | 313/468 |
| 4,585,673 A | * | 4/1986 | Sigai | ........................... | 427/213 |
| 4,874,985 A | * | 10/1989 | Hase et al. | ................... | 313/487 |
| 6,090,200 A | * | 7/2000 | Gray et al. | .................... | 117/68 |

* cited by examiner

Primary Examiner—Timothy Meeks
Assistant Examiner—Michael Cleveland
(74) Attorney, Agent, or Firm—William H. McNeill

(57) ABSTRACT

A method of increasing the color-stability of an electroluminescent phosphor which comprises the steps of forming the phosphor and then firing the formed phosphor in a vacuum in the presence of a material selected from the group of Eu, Ce, and Sm for a time sufficient to provide said increase in color-stability.

6 Claims, No Drawings

STABILIZATION OF COLOR IN HEATED ELECTROLUMINESCENT PHOSPHOR

This application claims priority from Provisional Application No. 60/256,283, filed Dec. 18, 2000.

TECHNICAL FIELD

This invention relates to electroluminescent phosphors and more particularly to such phosphors having increased color-stability during subsequent firing operations.

BACKGROUND ART

Electroluminescent phosphors are materials that emit light in the presence of an alternating current electric field. Such phosphors are known. A particular example is a ZnS:CuCl material available as Type 723 from Osram Sylvania Products Inc. in Towanda, Pa.

When placed in the presence of a suitable electric field, lamps employing these phosphors generally emit light m the blue-green area of the visile spectrum, i.e., having color coordinates (on a standard C.I.E. diagram) of x=0.184 and y=0.435. When used in some lamps it has occasionally been found necessary to provide these phosphors with coating to prevent moisture degradation. These coatings are applied by treating the phosphors, usually by a vapor deposition process, at temperatures above 175° C. This subsequent processing has been known to cause an unwanted and detrimental shift in the color emission of the phosphor, causing it to emit more in the yellow, that is, to a material having coordinates in the range of x=0.193 to 0.199 and y=0.471 to 0.444, the shift being dependent upon the temperature range of the firing.

DISCLOSURE OF INVENTION

It is, therefore, an object of the invention to obviate the disadvantages of the prior art and to provide a phosphor having increased color-stability.

These objects are accomplished, in one aspect of the invention, by a method of increasing the color-stability of an electroluminescent phosphor which comprises the steps of forming the phosphor and then firing the formed phosphor in a vacuum in the presence of a material selected from the group of Eu, Ce, and Sm for a time sufficient to provide said increase in color-stability.

BEST MODE FOR CARRYING OUT INVENTION

For a better understanding of the present invention, together with other and further objects, advantages and capabilities thereof reference is made to the following disclosure and appended claims.

Table I below gives the desired coordinates of a control sample (Item 1) as well as the undesired coordinates of two untreated samples (Items 2 and 3) fired at various temperatures and made into lamps. All firings of Items 2 and 3 were for 72 hours.

TABLE I

| Sample No. | Temperature ° C. | X | Y |
| --- | --- | --- | --- |
| Item 1 Control | Ambient | .184 | .435 |
| Item 2 | 500° C. | .193 | .471 |
| Item 3 | 700° C. | .199 | .444 |

It has been found that by firing a previously formed phosphor in the presence of an element selected from the group of Eu, Ce, and Sm the undesired color shift can be prevented. These data are presented in Table II, below.

TABLE II

| | Color | |
| --- | --- | --- |
| Reactant | X | Y |
| Item 1 | 0.184 | 0.435 |
| Item 2 | 0.193 | 0.471 |
| Eu | 0.183 | 0.431 |
| Ce | 0.179 | 0.436 |
| Sm | 0.179 | 0.440 |

Items 1 and 2 in the Table II are carried over from Table I. Item 2, as well as the three reactants listed, was fired at 500° C. for 72 hours.

Specifically, the phosphor employed was a Type 723, ZnS:Cu,Cl from Osram Sylvania. All tests were conducted in a thick-walled quartz vessel (wall thickness, 3.0 mm) under the following conditions.

From 1 to 4 grams of the chosen element (either as a powder or as granules) was placed at the bottom of the reaction vessel This material was then covered with a vapor permeable plug such as quartz wool. Non-reactive equivalent materials can also be used. The quartz wool is impervious to the powdered material but allows the vapor to pass through. On top of the vapor permeable barrier was placed from 25 to 40 grams of the phosphor. The vessel was then evacuated down to a pressure of approximately 730 to 750 mm of Hg and sealed. The vessel was then heated at 500° C. for 72 hours. Lamps made from these fired phosphors had the coordinates shown in Table II, indicating acceptable color emission well within the normal tolerance range for this phosphor.

In addition to the acceptable elements detailed above, tests under similar conditions were also conducted using Bi, Al, Co, Sb, Pb, Pd, Au, Ga, Sn, Ag, Gd, Y, Cu, Sc, Si, Mo, Mn, Cr, Mg, In, and Zn. The tests employing the latter four elements provided lamps that either failed completely or were too dim to read. All of the other tested elements provided lamps with extreme color shifts.

Thus, there is here provided a method for increasing the color-stability of ZnS:Cu,Cl electroluminescent phosphor.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A method of increasing the color-stability of ZnS:CuCl electroluminescent phosphor comprising the steps of:

forming said electroluminescent phosphor; and
   firing said electroluminescent phoshor in vacuum in the presence of a material selected from the group consisting of Eu, Ce, and Sm for a time sufficient to provide said increase in color-stability.

2. The method of claim 1 wherein said vacuum comprises a pressure of from about 730 to 750 mm of Hg.

3. The method of claim 2 wherein said time sufficient to provide said increase in color-stability is about 72 hours.

4. A method of increasing the color-stability of ZnS:CuCl electroluminescent phosphor comprising the steps of forming said electroluminescent phosphor;

placing in the bottom of a reaction vessel an effective amount of a powdered or granule form of an element selected from the group consisting of Eu, Ce, and Sm, said effective amount being sufficient to cause said increase in color-stability;

covering said element with a vapor permeable barrier;

adding an amount of said phosphor to said reaction vessel on top of said vapor barrier;

evacuating said reaction vessel to a pressure of 730 to 750 mm of Hg and sealing said reaction vessel; and heating said reaction vessel to a temperature of about 500° C. for about 72 hours.

5. The method of claim 4 wherein said vapor permeable barrier comprises a plug of quartz wool.

6. The method of claim 5 wherein said reaction vessel is a thick-walled quartz tube.

* * * * *